United States Patent
Matsubara

(10) Patent No.: US 8,305,426 B2
(45) Date of Patent: Nov. 6, 2012

(54) STEREOSCOPIC VIDEO DISPLAY APPARATUS AND METHOD THEREFOR

(75) Inventor: Shinzo Matsubara, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/183,189

(22) Filed: Jul. 14, 2011

(65) Prior Publication Data

US 2012/0147135 A1   Jun. 14, 2012

(30) Foreign Application Priority Data

Dec. 14, 2010   (JP) .................................. 2010-278070

(51) Int. Cl.
*H04N 13/00* (2006.01)
*H04N 7/00* (2011.01)

(52) U.S. Cl. .......................................... 348/42; 348/36

(58) Field of Classification Search ..................... 348/43, 348/60, 42, 46, 51, 56, 54, 94, 36, 373; 382/154, 382/285; 359/462, 467
See application file for complete search history.

(56) References Cited

U.S. PATENT DOCUMENTS

| 5,986,804 A | 11/1999 | Mashitani et al. |
| 2004/0252374 A1 | 12/2004 | Saishu et al. |
| 2006/0279750 A1 | 12/2006 | Ha |
| 2008/0218856 A1 | 9/2008 | Saishu et al. |

FOREIGN PATENT DOCUMENTS

| JP | 10-215466 | 8/1998 |
| JP | 2000-261828 | 9/2000 |
| JP | 2004-295013 | 10/2004 |
| JP | 2006-352877 | 12/2006 |

*Primary Examiner* — Behrooz Senfi

(74) *Attorney, Agent, or Firm* — Blakely, Sokoloff, Taylor & Zafman LLP

(57) ABSTRACT

According to one embodiment, the stereoscopic video display apparatus includes a 3D processing module and a message insertion module. The 3D processing module converts a 3D video display signal of the twin type into the 3D video display signal of a glasses-less type. The message insertion module outputs a notification message making a notification that stereoscopic video of the glasses-less type is different from the stereoscopic video of the twin type.

5 Claims, 6 Drawing Sheets

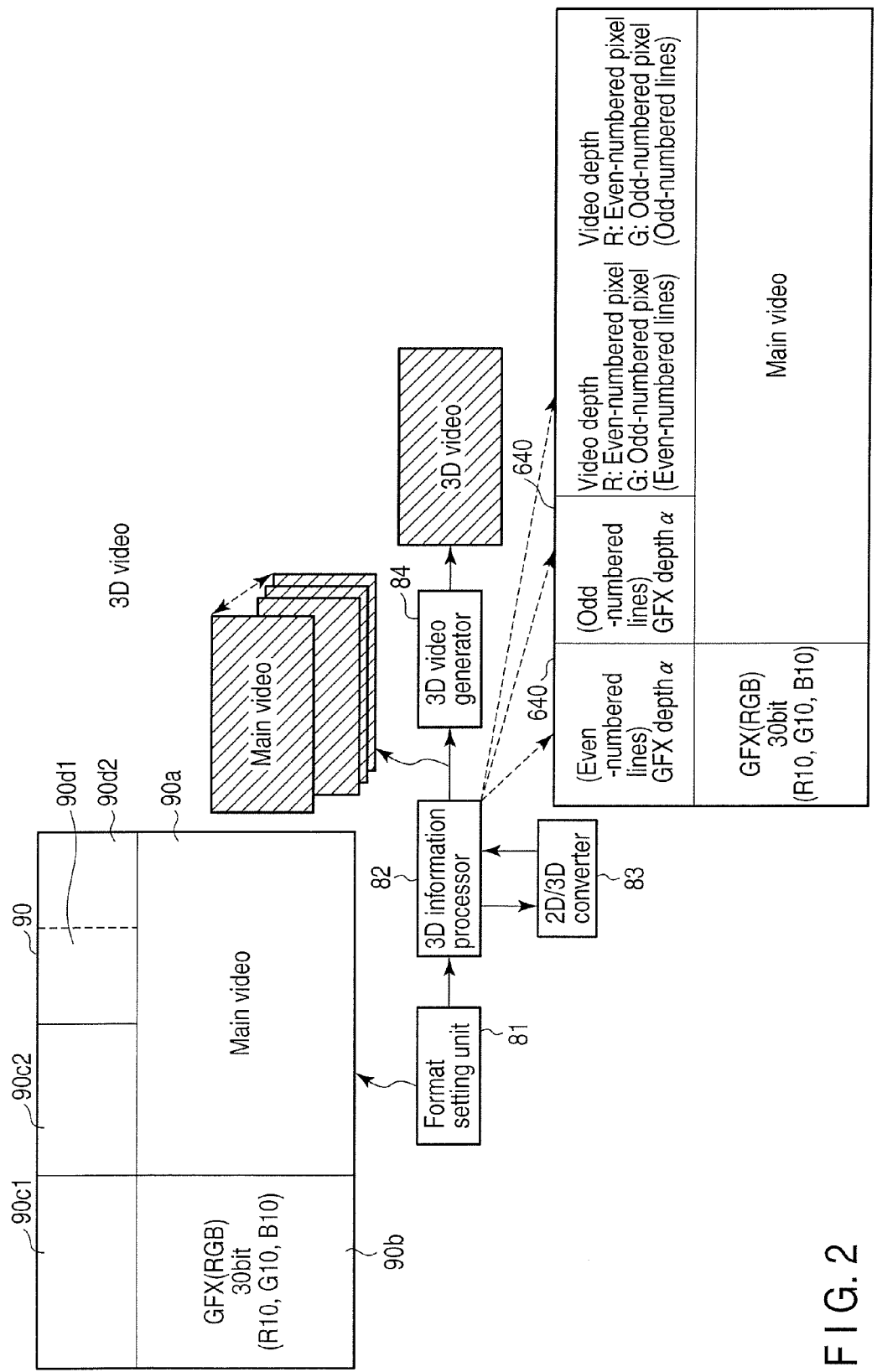
F I G. 2

STEREOSCOPIC VIDEO DISPLAY APPARATUS AND METHOD THEREFOR

CROSS-REFERENCE TO RELATED APPLICATIONS

This application is based upon and claims the benefit of priority from Japanese Patent Application No. 2010-278070, filed Dec. 14, 2010; the entire contents of which are incorporated herein by reference.

FIELD

Embodiments described herein relate generally to a stereoscopic video display apparatus and a method therefor.

BACKGROUND

Stereoscopic video display technology of a glasses-less type capable of perceiving stereoscopic video without using special glasses can be classified in various ways. Such stereoscopic video display technology is generally classified into a binocular parallax method using a binocular parallax and a spatial image reproducing method that actually forms a spatial image.

The binocular parallax method is further classified into a twin type and a multi type. The twin type is a method by which an image for the left eye and an image for the right eye are made visible by the left eye and the right eye, respectively. The multi type is a method by which a range in which stereoscopic video is observable is broadened by using a plurality of observation positions when a video is shot to increase the amount of information.

The spatial image reproducing method is further classified into a holograph method and an integral photography method (hereinafter, called the integral method, but may also be called a ray reproducing method). The integral method may be classified as the binocular parallax method. According to the integral method, rays take quite opposite paths between shooting and reproducing video and thus, almost complete stereoscopic video is reproduced if the number of rays is made sufficiently large and the pixel size can be made sufficiently small. Thus, the ideal integral method is classified as the spatial image reproducing method.

Incidentally, to perceive stereoscopic video without glasses as in the multi type and the integral method, the configuration described below is normally adopted. A stereoscopic video display pixel arrangement is configured on a two-dimensional image display pixel arrangement. A mask (also called a ray control element) having a function to control rays from stereoscopic video display pixels is arranged on a front face side of the stereoscopic video display pixel arrangement. The mask is provided with window portions far smaller than stereoscopic video display pixels (typically as small as two-dimensional image display pixels) in positions corresponding to stereoscopic video display pixels.

A fly eye lens in which micro-lenses are arranged two-dimensionally, a lenticular seat in a shape in which optical openings extend linearly in the vertical direction and are periodically arranged in the horizontal direction, or slits are used as the mask.

According to such a configuration, element images displayed by individual stereoscopic video display pixels are partially blocked by the mask so that an observer visually recognizes only element images that have passed through window portions. Therefore, two-dimensional image display pixels visually recognized via some window portion can be made different from observation position to observation position so that stereoscopic video can be perceived without glasses.

A plurality of types of transmission methods of a stereoscopic video display signal to obtain the above stereoscopic video is known. For the twin type, for example, a method of alternately transmitting a video signal for the left eye and a video signal for the right eye for each horizontal scanning line, a method of alternately transmitting a video signal for the left eye and a video signal for the right eye for each frame, a method of transmitting a video signal for the left eye and a video signal for the right eye by arranging the signals on an upper side and a lower side of a frame, and a method of transmitting a video signal for the left eye and a video signal for the right eye by arranging the signals on a left side and a right side of a frame are known.

Also, a technology to convert a two-dimensional (2D) video display signal into a stereoscopic (3D) video display signal and a technology to generate a 3D video display signal by imaging using two cameras have been developed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary view showing a representative configuration example of a 3D processing module;

DETAILED DESCRIPTION

Various embodiments will be described hereinafter with reference to the accompanying drawings.

In general, according to one embodiment, a stereoscopic video display apparatus and a method therefor capable of notifying a viewer that a 3D representation of video is different from an original when a 3D video display signal of a twin type is displayed.

According to the present disclosure, the stereoscopic video display apparatus includes a 3D processing module that converts a 3D video display signal of the twin type into the 3D video display signal of a glasses-less type and a message insertion module that outputs a notification message making a notification that stereoscopic video of the glasses-less type is different from the stereoscopic video of the twin type.

An embodiment will further be described below with reference to the drawings.

Figure 1:
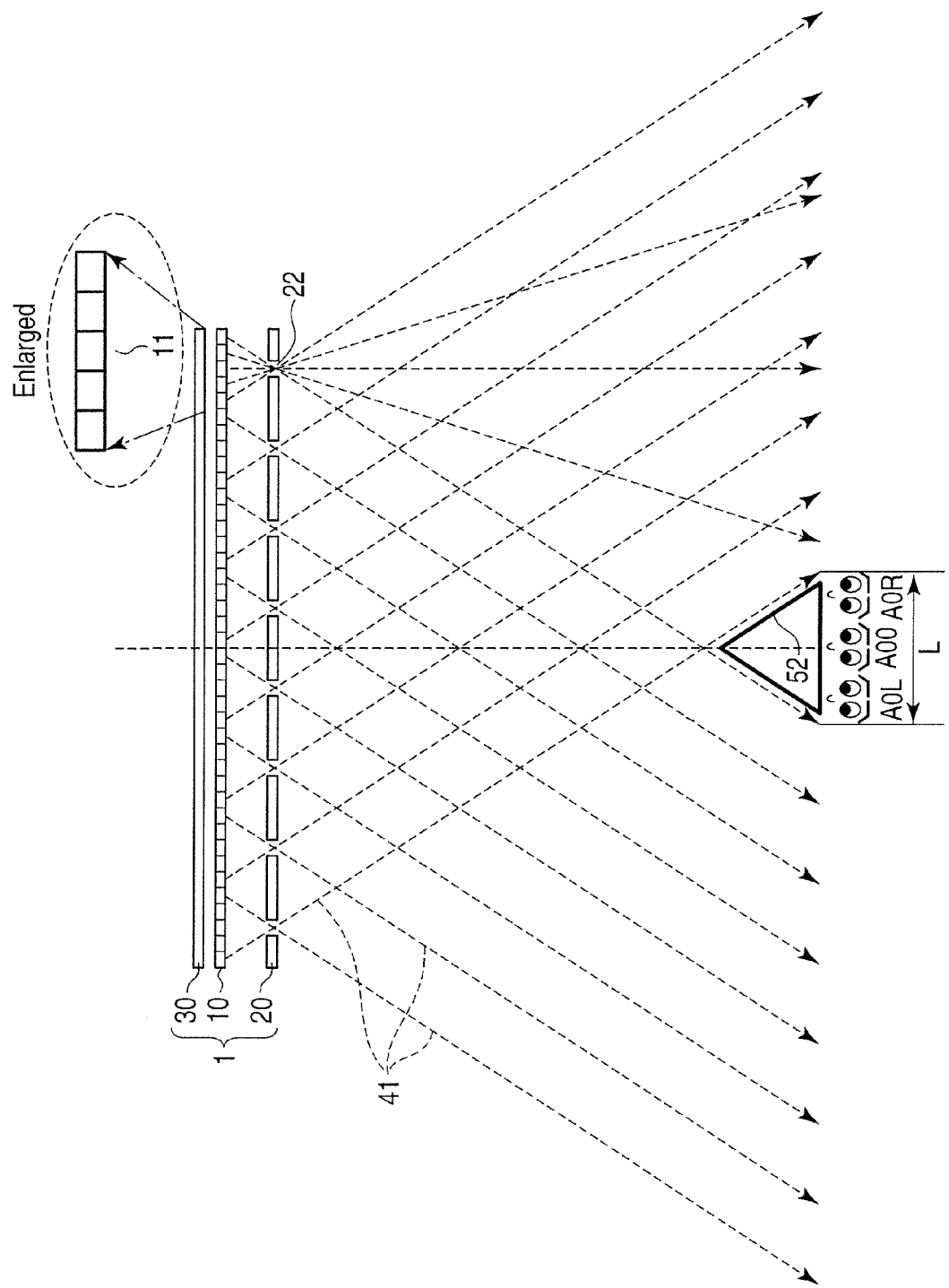
FIG. 1 is an exemplary view showing a representative outline of a stereoscopic video display apparatus according to an embodiment.

First, the principle of a stereoscopic video display will be described. FIG. 1 is a sectional view schematically showing an example of a stereoscopic video display apparatus according to an embodiment. The embodiment describes an example of stereoscopic vision by the integral method, but the method of stereoscopic vision is not limited to the integral method and any glasses-less type may be used.

A stereoscopic video display apparatus 1 shown in FIG. 1 is of the glasses-less type and includes a display unit 10 including many stereoscopic video display pixels 11 arranged horizontally and vertically and a mask 20 separated from the stereoscopic video display pixels 11 and provided with many window portions 22 corresponding to the stereoscopic video display pixels 11.

The mask 20 includes optical openings and has a function to control rays from the pixels. The mask 20 is also called a parallax barrier or ray control element. A transparent substrate having formed thereon a light-shielding body pattern with many openings corresponding to the many window portions 22 or a light-shielding plate provided with many through-holes corresponding to the many window portions 22 can be used as the mask 20. Alternatively, a fly eye lens in which many micro-lenses are arranged two-dimensionally or a lenticular seat in a shape in which optical openings extend linearly in the vertical direction and are periodically arranged in the horizontal direction can also be used as other examples of the mask 20. Further, a transmission type liquid crystal display unit in which the arrangement, dimensions, shape and the like of the window portion 22 are freely changeable can be used as the mask 20.

For stereoscopic vision of a still image, the stereoscopic video display pixels 11 may be paper on which an image is printed. However, for stereoscopic vision of dynamic images, the stereoscopic video display pixels 11 are realized by using a liquid crystal display unit. Many pixels of the transmission type liquid crystal display unit 10 constitute the many stereoscopic video display pixels 11 and a backlight 30 serving as a surface light source is arranged on the back face side of the liquid crystal display unit 10. The mask 20 is arranged on the front face side of the liquid crystal display unit 10.

When the transmission type liquid crystal display unit 10 is used, the mask 20 may be arranged between the backlight 30 and the liquid crystal display unit 10. Instead of the liquid crystal display unit 10 and the backlight 30, a self-light emitting display apparatus such as an organic EL (electro-luminescence) display apparatus, cathode ray tube, and plasma display apparatus may be used. In such a case, the mask 20 is arranged on the front face side of the self-light emitting display apparatus.

FIG. 1 schematically shows a relationship between the stereoscopic video display apparatus 1 and observation positions A00, A0R, and A0L.

The observation position is a position after moving in a horizontal direction of a display screen while maintaining the distance to the screen (or the mask) constant. This example shows a case where one stereoscopic video display pixel 11 is constituted of a plurality of (for example, five) two-dimensional display pixels. The number of pixels is only an example and may be less than five (for example, two) or more (for example, nine).

In FIG. 1, a broken line 41 is a straight line (ray) linking the center of a single pixel positioned in the boundary between the adjacent stereoscopic video display pixels 11 and the window portion 22 of the mask 20. In FIG. 2, an area of a thick line 52 is an area in which true stereoscopic video (original stereoscopic video) is perceived. The observation positions A00, A0R, and A0L are positioned within the area of the thick lines 52. An observation position in which only true stereoscopic video is perceived will be called a "viewing area" below.

FIG. 2 shows an example of a 3D processing module 80 that converts a 2D video display signal into a 3D video display signal. The 3D processing module 80 receives a twin 3D video display signal in which, for example, a 2D video display signal for the left eye is arranged in a left area and a 2D video display signal for the right eye is arranged in a right area.

The 3D processing module 80 converts one of 2D video display signals of a twin 3D video display signal into a glasses-less type 3D video display signal. That is, the 3D processing module 80 forms a 2D video display signal into a 3D signal format. If a 3D signal is input, the signal can be adopted unchanged. The 3D signal format can contain a 2D digital input video signal (main video data) and graphics such as OSD and other data simultaneously.

After being 3D-formatted by a format setting unit 81, the 2D digital input video signal is input into a 3D information processor 82. The 3D information processor 82 extracts main video data and sends the extracted video data to a 2D/3D converter 83. The 2D/3D converter 83 generates depth information (this information, which may also be called length information, is assumed to contain parallax information) for each pixel of the main video data. The 3D information processor 82 uses information of the 3D signal format generated by the format setting unit 81 and the depth information of the main video data generated by the 2D/3D converter 83 to generate a plurality of (for example, nine) video planes for 3D configuration. The depth information for each pixel of graphic data may be preset to the format setting unit 81.

The plurality of video planes for 3D configuration and the depth information are input into a 3D video generator 84 for conversion into a 3D video display signal (stereoscopic video display signal). The 3D video display signal becomes a pattern signal that drives stereoscopic video display pixels shown in FIG. 2.

The 3D signal format includes an area 90a to arrange main video data, an area 90b to arrange graphic data (including R, G, and B pixels), an area 90c1 to arrange depth information of pixels of even-numbered lines of the graphic data and an α value, an area 90c2 to arrange depth information of pixels of odd-numbered lines of the graphic data, an area 90d1 to arrange depth information of pixels of even-numbered lines of the main video data and the α value, and an area 90d2 to arrange depth information of pixels of odd-numbered lines of the main video data. Depth information of pixels of the main video data contains depth information about even-numbered pixels and odd-numbered pixels. The α value is a value indicating the degree of overlapping with pixels of graphic data.

The area 90a of main video data has, for example, 1280 pixels×720 lines, the area 90b has
640 pixels×720 lines, the area 90c1 has
640 pixels×360 lines, the area 90c2 has
640 pixels×360 lines, the area 90d1 has
320 pixels×360 lines, and the area 90d2 has
320 pixels×360 lines.

The other areas 90c1, 90c2, 90d1, 90d2 than the areas 90a, 90b of main video data and graphic data may be called control information areas. Control information is generated by the 3D information processor 82 and the 2D/3D converter 83 and arranged in predetermined areas.

Figure 3:
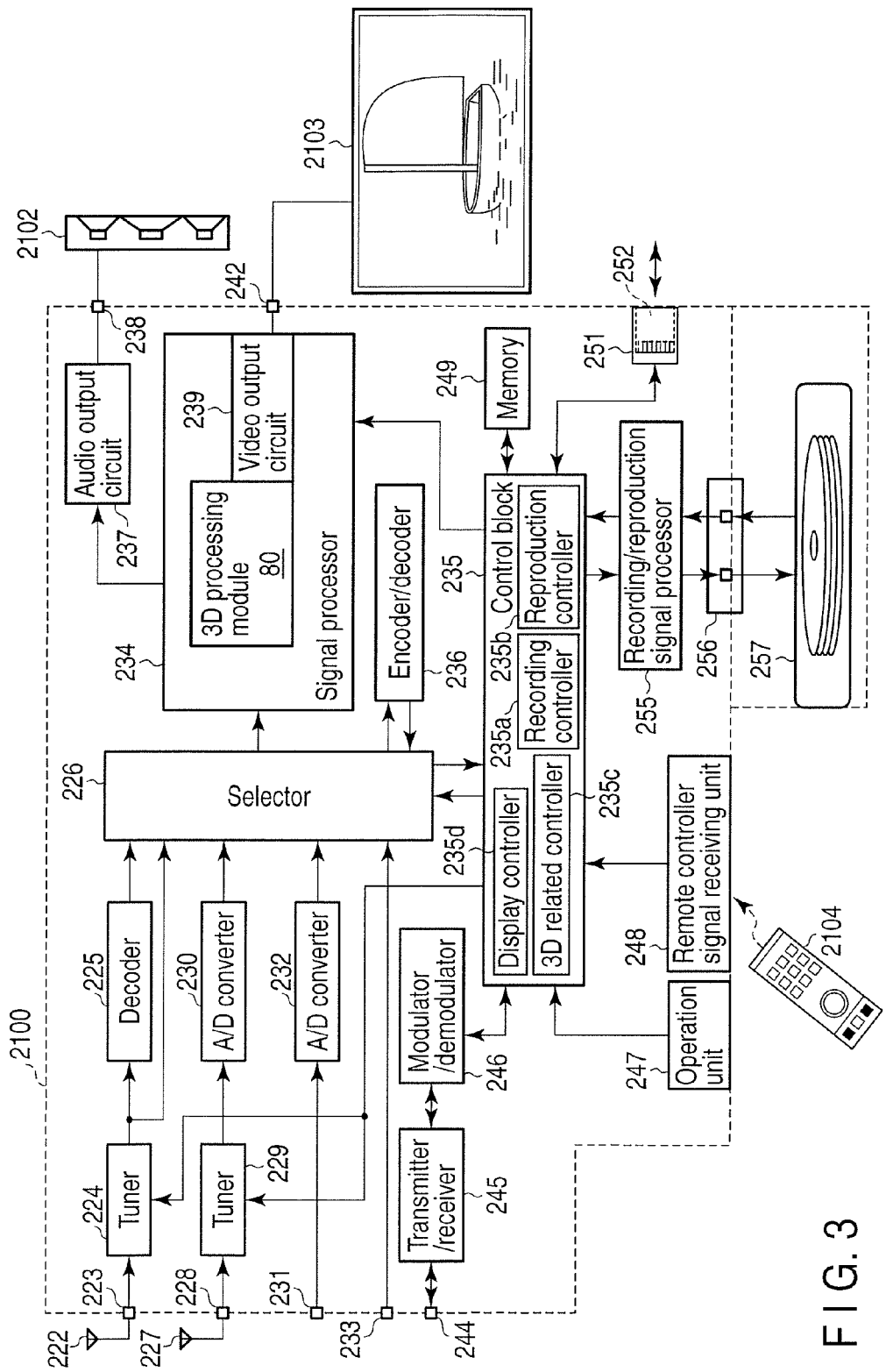
FIG. 3 is an exemplary view showing a representative overall configuration example of a TV set with which a stereoscopic video display apparatus is integrated.

FIG. 3 schematically shows a signal processing system of the TV set 2100, which is an example of an apparatus to which the embodiment is applied. A digital TV broadcasting signal received by an antenna 222 for receiving digital TV broadcasting is supplied to a tuner 224 via an input terminal 223. The tuner 224 tunes in to and demodulates a signal of the desired channel from the input digital TV broadcasting signal. A signal output from the tuner 224 is supplied to a decoder 225 where decode processing according to, for example, the MPEG (moving picture experts group) 2 method is performed before being supplied to a selector 226.

Output from the tuner 224 is also supplied to the selector 226 directly. Video/audio information is separated by the selector 226 so that the video/audio information can be processed by a recording/reproduction signal processor 255 via a control block 235. A signal processed by the recording/reproduction signal processor 255 can be recorded in a hard disk drive (HDD) 257. The HDD 257 is connected as a unit to the recording/reproduction signal processor 255 via a terminal 256 and can be replaced. The HDD 257 contains a recorder and a reader of a signal.

An analog TV broadcasting signal received by an antenna 227 for analog TV broadcasting is supplied to a tuner 229 via an input terminal 228. The tuner 229 tunes in to and demodulates a signal of the desired channel from the input analog TV broadcasting signal. Then, a signal output from the tuner 229 is digitized by an A/D (analog/digital) converter 230 before being output to the selector 226.

Analog video and audio signals supplied to an input terminal 231 for an analog signal to which, for example, devices such as a VTR are connected are supplied to an A/D converter 232 for digitalization and then output to the selector 226. Further, digital video and audio signals supplied to an input terminal 233 for a digital signal connected to an external device such as an optical disk or magnetic recording medium reproduction apparatus via, for example, HDMI (High Definition Multimedia Interface) are supplied to the selector 226 unchanged.

When an A/D converted signal is recorded in the HDD 257, compression processing based on a predetermined format, for example, the MPEG (moving picture experts group) 2 method is performed on the A/D converted signal by an encoder in an encoder/decoder 236 accompanying the selector 226 before the A/D converted signal is recorded in the HDD 257 via the recording/reproduction signal processor 255. When the recording/reproduction signal processor 255 records information in the HDD 257 in cooperation with a recording controller 235a, for example, what kind of information to record in which directory of the HDD 257 is preprogrammed. Thus, conditions when a stream file is stored in a stream directory and conditions when identification information is stored in a recording list file are set.

The selector 226 selects one pair from four types of input digital video and audio signals to supply the pair to a signal processor 234. The signal processor 234 separates audio information and video information from the input digital video signal and performs predetermined signal processing thereon. Audio decoding, tone adjustment, mix processing and the like are arbitrarily performed as the signal processing on the audio information. Color/brightness separation processing, color adjustment processing, image quality adjustment processing and the like are performed on the video information.

The 3D processing module 80 described above is contained in the signal processor 234. A video output unit 239 switches to 3D signal output or 2D signal output in accordance with 3D/2D switching. The video output unit 239 includes a synthesis unit that multiplexes graphic video, video of characters, figures, symbols and the like, user interface video, video of a program guide and the like from the control block 235 onto main video. The video output unit 239 may contain a scanning line number conversion.

Audio information is converted into an analog form by an audio output circuit 237 and the volume, channel balance and the like thereof are adjusted before being output to a speaker apparatus 2102 via an output terminal 238.

Video information undergoes synthesis processing of pixels, the scanning line number conversion and the like in the video output unit 239 before being output to a display apparatus 2103 via an output terminal 242. As the display apparatus 2103, for example, the apparatus described in FIG. 1 is adopted.

Various kinds of operations including various receiving operations of the TV set 2100 are controlled by the control block 235 in a unified manner. The control block 235 is a set of microprocessors incorporating CPUs (central processing units). The control block 235 controls each of various blocks so that operation information from an operation unit 247 or operation information transmitted from a remote controller 2104 is acquired by a remote controller signal receiving unit 248 whereby operation content thereof is reflected.

The control block 235 uses a memory 249. The memory 249 mainly includes a ROM (read only memory) storing a control program executed by a CPU thereof, a RAM (random access memory) to provide a work area to the CPU, a non-volatile memory in which various kinds of setting information and control information are stored.

The apparatus can perform communication with an external server via the Internet. A downstream signal from a connection terminal 244 is demodulated by transmitter/receiver 245 and demodulated by a modulator/demodulator 246 before being input into the control block 235. An upstream signal is modulated by the modulator/demodulator 246 and converted into a transmission signal by the transmitter/receiver 245 before being output to the connection terminal 244.

The control block 235 can perform conversion processing on dynamic images or service information downloaded from an external server to supply the converted images or information to the video output unit 239. The control block 235 can also transmit a service request signal to an external server in response to a remote controller operation.

Further, the control block 235 can read data in a card type memory 252 mounted on a connector 251. Thus, the present apparatus can read, for example, photo image data from the card type memory 252 to display the photo image data in the display apparatus 2103. When special color adjustments are made, image data from the card type memory 252 can be used as standard data or reference data.

In the above apparatus, a user views a desired program of a digital TV broadcasting signal and also selects a program by operating the remote controller 2104 to control the tuner 224 if the user wants to save the program in the HDD 257.

Output of the tuner 224 is decoded by the decoder 225 into a base-band video signal and the base-band video signal is input into the signal processor 234 from the selector 226. Accordingly, the user can view the desired program in the display apparatus 2103.

A stream (including many packets) of the selected program is input into the control block 235 via the selector 226. If the user performs a recording operation, the recording controller 235a selects the stream of the program and supplies the stream to the recording/reproduction signal processor 255. For example, a file number is attached to the stream of the selected program and the stream is stored in a file directory of the HDD 257 as a stream file by the operations of the recording controller 235a and the recording/reproduction signal processor 255.

If the user wants to reproduce and view the stream file recorded in the HDD 257, the user operates, for example, the remote controller 2104 to specify the display of, for example, a recording list file.

The recording list file has a table of a file number and a file name (called identification information) indicating what kinds of stream files are recorded in the HDD 257. If the user specifies the display of the recording list file, a recording list is displayed as a menu and the user moves the cursor to a desired program name or file number in the displayed list before operating the Decision button. Then, the reproduction of the desired stream file is started.

The specified stream file is read from the HDD 257 under the control of a reproduction controller 235*b* and decoded by the recording/reproduction signal processor 255 before being input into the signal processor 234 via the control block 235 and the selector 226.

The control block 235 includes a recording controller 235*a*, a reproduction controller 235*b*, and a 3D related controller 235*c*.

Figure 4:
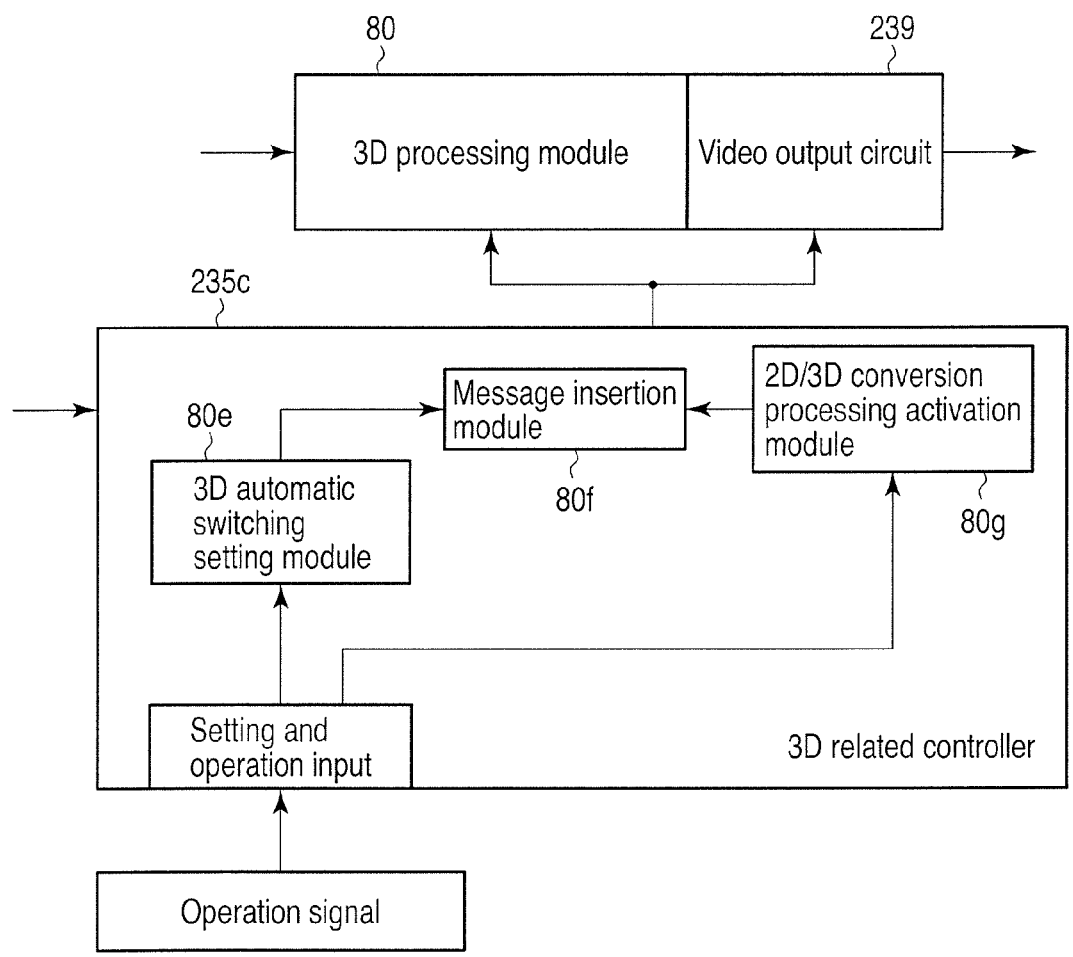
FIG. 4 is an exemplary view showing a representative relationship between the 3D processing module and a 3D related controller.

FIG. 4 picks up and shows a relationship between the 3D related controller 235*c*, and the 3D processing module 80 and the video output unit 239.

The 3D related controller 235*c* includes a message insertion module 80*f* that outputs a notification message. The message insertion module 80*f* outputs a notification message when the 3D processing module 80 is set to Enable.

The 3D processing module 80 automatically converts a 2D video display signal into a 3D stereoscopic video display signal when enabled. Also at this point, a notification that gradually disappears may temporarily be output.

The 3D related controller 235*c* can receive an operation signal of initialization and operation signals for switching various operations. A 3D automatic switching setting module 80*e* operates when 3D viewing is initialized.

Figure 5A:
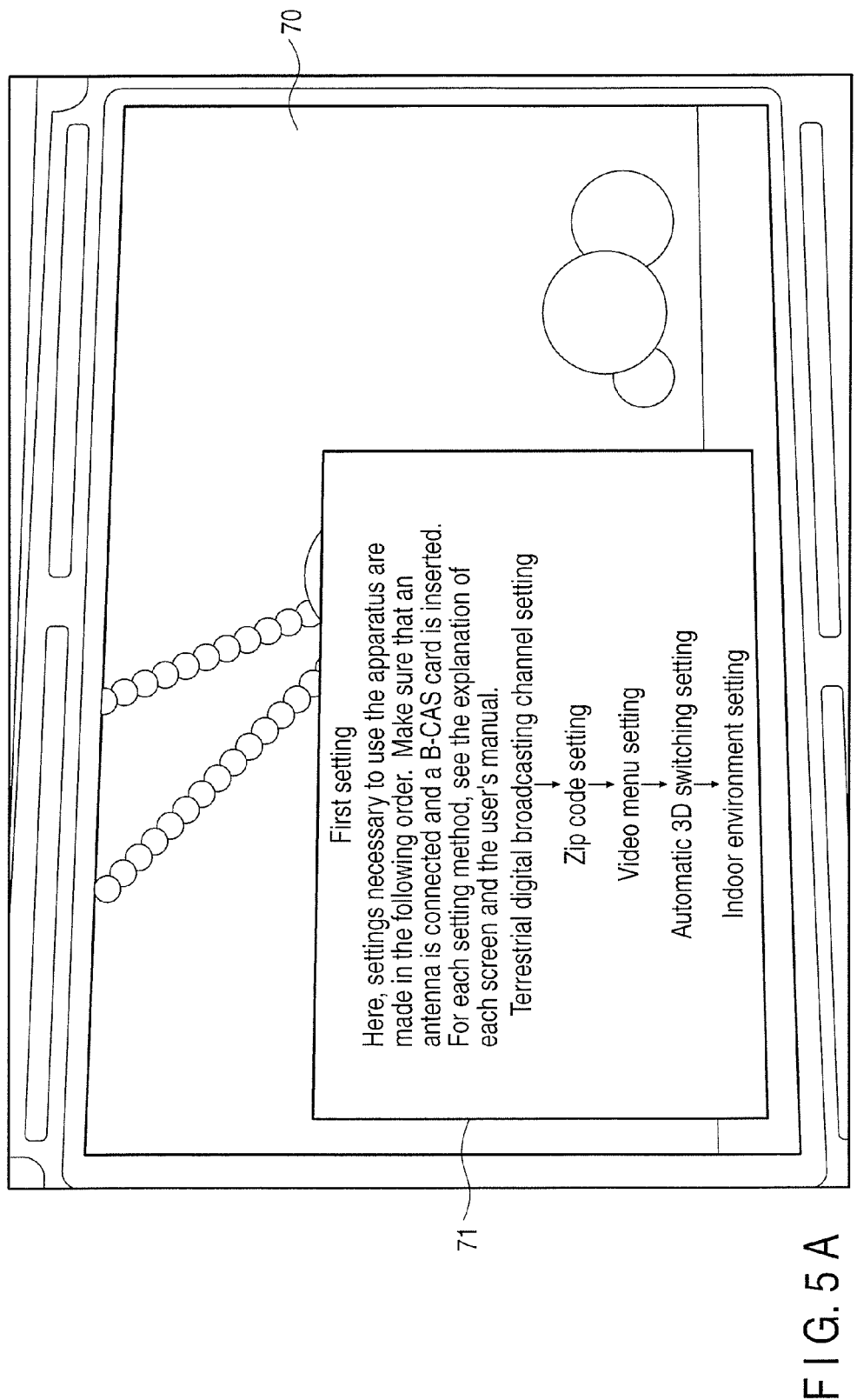
FIG. 5A is an exemplary view showing a representative menu screen example when 3D related control settings of the stereoscopic video display apparatus are made.
Figure 5B:
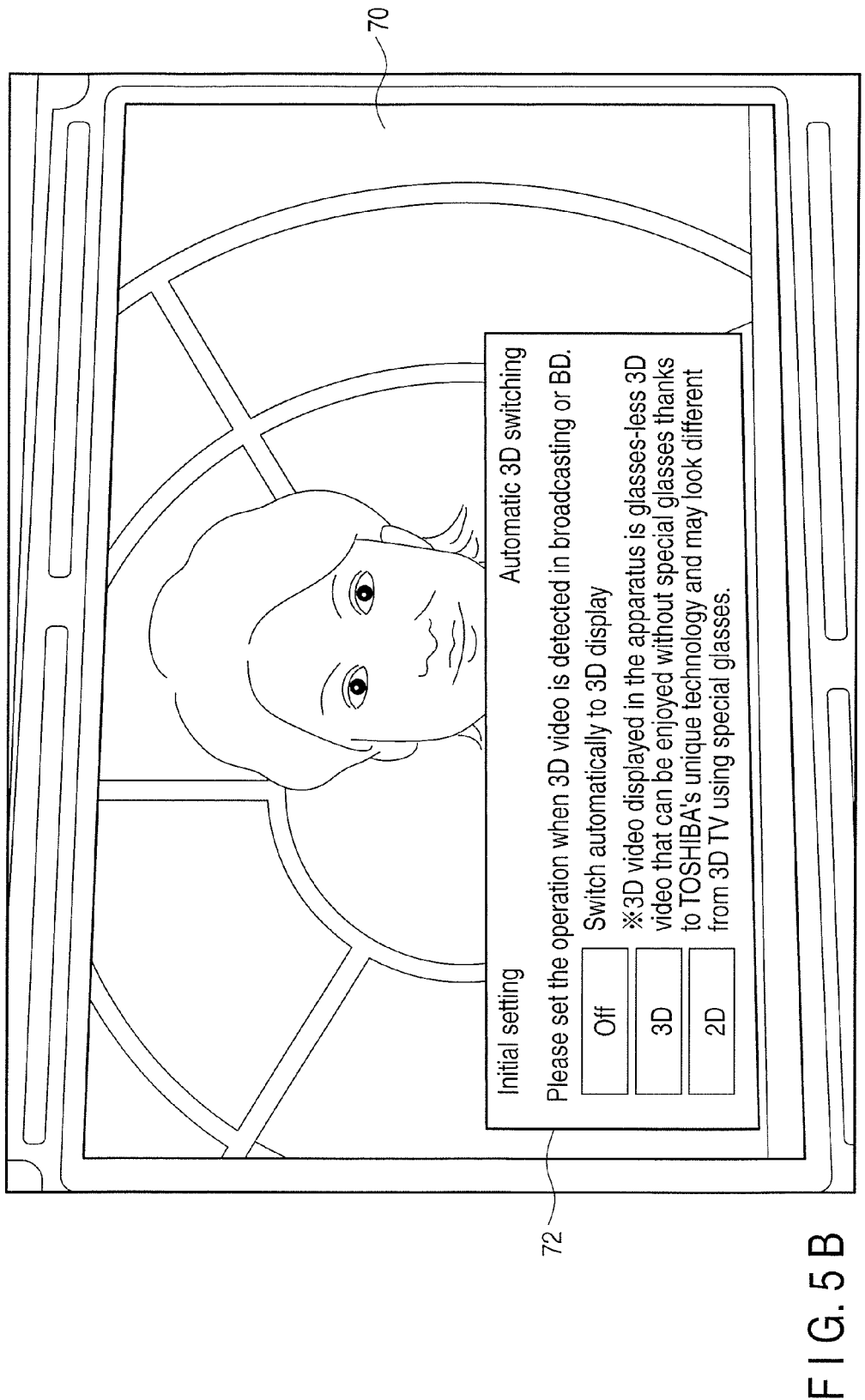
FIG. 5B is an exemplary view showing a representative setting screen example when 3D related control settings of the stereoscopic video display apparatus are made.

If, for example, a menu button of the remote controller is pressed, a menu screen 71 appears in a screen 70 as shown, for example, in FIG. 5A. In the menu screen 71, there is an item called "3D automatic switching setting". If the user operates the remote controller to move the cursor, selects "3D automatic switching setting", and presses the Decision button, a 3D setting screen 72 as shown, for example, in FIG. 5B is displayed.

The 3D setting screen 72 has "Off", "3D", and "2D" as selection items. If the user operates the remote controller to move the cursor, selects the item "3D", and presses the Decision button, the 3D processing module 80 is set to Enable. At this point, the item "3D" is highlighted. Also at this point, the message insertion module 80*f* outputs a notification message. The notification message has content, for example, "3D video displayed in this apparatus is glassless 3D video that can be viewed without special glasses thanks to our specific technology and may look different from 3D video using special glasses".

If the user operates the remote controller to move the cursor, selects the item "Off", and presses the Decision button, the 3D processing module 80 is set to Disable. At this point, the item "2D" is highlighted. In this case, no notification message is displayed.

In this apparatus, as described above, when a 3D video signal is obtained by the 3D processing module 80 to display stereoscopic video viewed with naked eyes, a notification message is made in advance. Thus, the viewer can anticipate or expect the nature of 3D video in advance and so even if 3D video viewed with naked eyes is different from video viewed with glasses, the viewer will not have an uncomfortable feeling.

In the above description, a notification message is displayed when "3D automatic switching setting" is initialized. However, the present apparatus may temporarily display a notification message also when the 3D processing module 80 is activated. A case where the 3D processing module 80 is activated is when, for example, a state in which a 2D video display signal is input into the signal processor 234 changes to a state in which a twin 3D video display signal is input into the signal processor 234. In such a case, the 3D processing module 80 converts one 2D video display signal of the twin 3D video display signal into a 3D video display signal of the glasses-less type. Also a case where the 3D processing module 80 is activated is when, for example, the viewer operates the remote controller to activate the 3D processing module 80 from a state in which the 3D processing module 80 is off (disabled). In such a case, a message insertion module 80*f* operates in response to a command of a 2D/3D conversion processing activation module 80*g* so that a notification message may be temporarily displayed in accordance with the operation.

When activated automatically, the 3D processing module 80 converts a portion of a twin 3D video display signal into a 3D video display signal of the glasses-less type. A signal that acts as a trigger to automatically activate the 3D processing module 80 is, for example, a portion of control information contained in a signal input via HDMI. The 3D related controller 235*c* analyzes control information transmitted from an HDMI 1261 and can determine whether 3D compatible video signal is input based on a portion of the control information. If a 3D compatible video signal is input, the 3D processing module 80 is activated and at this point, the above notification message may temporarily be displayed. Various methods to display a notification message are available. For example, there are a method by which large characters appear and then become smaller before disappearing, a method by which characters gradually become transparent and disappear, and a method by which characters scroll and disappear.

In the above embodiments, the module is used as a name of some blocks. However, the module is not limited in the scope of the invention. It may be used block, unit, processor, circuit and combination of these terms instead of the module.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic video display apparatus, comprising:
a three-dimensional (3D) processing module configured to convert a 3D video display signal of a twin type into a 3D video display signal of a glasses-less type; and
a message insertion module configured to output a notification message making a notification that stereoscopic video of the glasses-less type is different from stereoscopic video of the twin type.

2. The stereoscopic video display apparatus according to claim 1, wherein the message insertion module outputs the notification message when the 3D processing module is initialized.

3. The stereoscopic video display apparatus according to claim 2, wherein the message insertion module outputs the notification message when the 3D processing module is activated.

4. The stereoscopic video display apparatus according to claim 2, wherein the message insertion module outputs the notification message when the 3D processing module is activated.

5. A stereoscopic video display method by which a three-dimensional (3D) video display signal of a twin type is converted into a 3D video display signal of a glasses-less type by a 3D processing module and a message output from a message insertion module is multiplexed onto the 3D video display signal of the glasses-less type, comprising:
    outputting a notification message making a notification that stereoscopic video observed with naked eyes is different from stereoscopic video of the twin type.

* * * * *